UNITED STATES PATENT OFFICE.

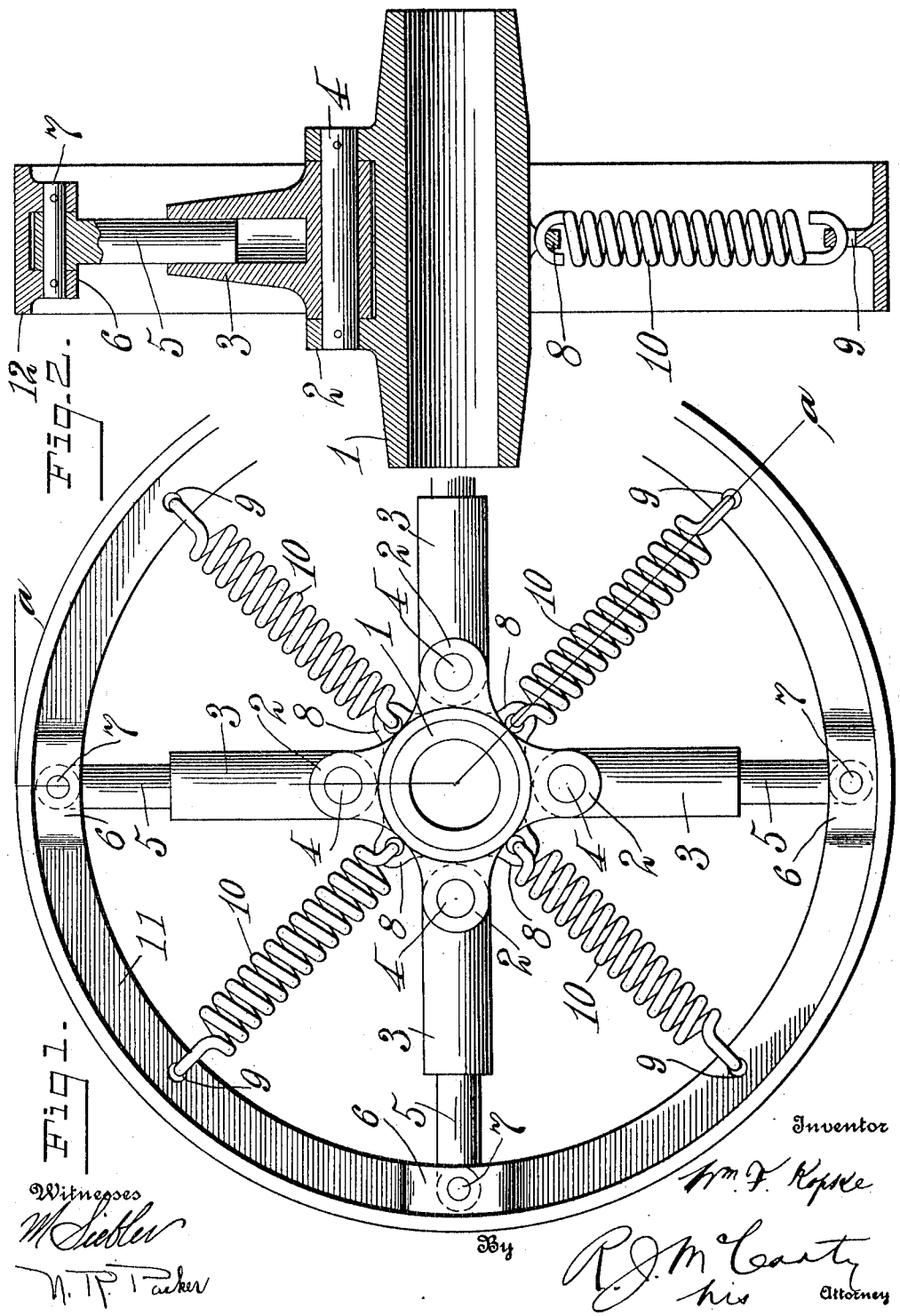

WILLIAM F. KOPKE, OF DAYTON, OHIO.

RESILIENT WHEEL.

1,114,891.	Specification of Letters Patent.	Patented Oct. 27, 1914.

Application filed October 9, 1911. Serial No. 653,702.

*To all whom it may concern:*

Be it known that I, WILLIAM F. KOPKE, a citizen of the United States, residing at Dayton, in the county of Montgomery and State of Ohio, have invented certain new and useful Improvements in Resilient Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels for motor vehicles.

The object of the invention is to provide a wheel of the above type with structural features constructed and arranged as set forth in the description to follow, and as pointed out in the subjoined claim.

Referring to the accompanying drawings, Figure 1 is a side elevation of my improved resilient wheel; and Fig. 2 is a section on the line *a—a* of Fig. 1.

Particularly describing the same, the wheel consists of a hub 1 provided with apertured ears 2 which receive pintles 4. Pivoted on the pintles 4 are the inner female members 3 of telescopic spokes. The ears 2 are separated a sufficient extent to form broad and substantial bearings for the spokes, which bearings are capable of resisting the side thrusts received by the wheel. The female members 3 receive outer male members 5 of telescopic spokes, provided with apertures which receive pintles 7. The pintles 7 pass through the bisected apertured portions 6 which are integral with the annular flange 11 extending from the inner side of the wheel rim 12. By thus constructing the rim, the same is made of a minimum amount of material yet is of considerable strength. The pintles 7 are supported at each end by a broad bearing. The bearing for the male members 5 therefore of the spokes are of a sufficient width to overcome the bending and twisting strains thrown upon the rim when the wheel receives a lateral thrust. The connection between the hub 1 and the rim 12 through the telescopic spokes is a free sliding one which permits the hub to move relatively to the rim. This movement is controlled by a plurality of resilient members or springs 10 which lie at equal distances between the telescopic spokes. The inner ends of the springs 10 are connected to apertured lugs 8 extending from the hub, while the outer ends of said springs are received by openings 9 in the inner flange 11 of the rim.

It will be seen that a resilient wheel as thus constructed, is of light weight and yet is of sufficient strength to overcome lateral strains thrown upon the rim. By this arrangement, the springs and spokes do not interfere with each other and may be designed independently thereby allowing the parts to be proportioned according to their requisite strength, and as they all lie in the same plane they are adapted to receive the thrusts and strains without a tendency to distort the hub or the rim of the wheel.

I claim,

A wheel of the character specified, comprising a rim having an inwardly projected annular flange, said flange having uniformly positioned bisected portions, a hub having alined apertured ears projecting therefrom and lying substantial distances apart, a series of telescopic spokes, the tubular members of said spokes having each a wide base which is pivotally connected between the apertured ears of the hub, the outer members of said telescopic spokes being pivotally mounted between the bisected portions of the rim flange in alinement with the transverse axis of the hub, and a series of helical springs arranged at uniform distances between the spokes and in alinement therewith and with the transverse axis of the hub, said springs having their inner ends connected to apertured ears on the hub midway between the ears to which the tubular member of the spokes are connected and the outer ends of said springs being connected with the rim flange, substantially as specified.

In testimony whereof I affix my signature, in presence of two witnesses.

WILLIAM F. KOPKE.

Witnesses:
R. J. McCARTY,
MATTHEW SIEBLER.

Copies of this patent may be obtained for five cents each, by addressing the "Commissioner of Patents, Washington, D. C."